(12) United States Patent
Wang et al.

(10) Patent No.: US 9,456,169 B2
(45) Date of Patent: Sep. 27, 2016

(54) METHOD FOR IMPLEMENTING SPLIT-SCREEN VIEWING OF TELEVISION PROGRAMS, SET-TOP BOX, AND TELEVISION SYSTEM

(71) Applicant: ZTE CORPORATION, Shenzhen, Guangdong Province (CN)

(72) Inventors: Weiwei Wang, Shenzhen (CN); Linan Shi, Shenzhen (CN); Wei Tang, Shenzhen (CN)

(73) Assignee: ZTE Corporation (CN)

( * ) Notice: Subject to any disclaimer, the term of this patent is extended or adjusted under 35 U.S.C. 154(b) by 0 days.

(21) Appl. No.: 14/434,769

(22) PCT Filed: Aug. 19, 2013

(86) PCT No.: PCT/CN2013/081723
§ 371 (c)(1),
(2) Date: Apr. 10, 2015

(87) PCT Pub. No.: WO2013/189357
PCT Pub. Date: Dec. 27, 2013

(65) Prior Publication Data
US 2015/0281627 A1 Oct. 1, 2015

(30) Foreign Application Priority Data
Oct. 11, 2012 (CN) .......................... 2012 1 0384227

(51) Int. Cl.
*H04N 5/45* (2011.01)
*H04N 5/445* (2011.01)
(Continued)

(52) U.S. Cl.
CPC ........ *H04N 5/44591* (2013.01); *H04N 5/4403* (2013.01); *H04N 5/45* (2013.01); *H04N 21/42207* (2013.01); *H04N 21/4316* (2013.01); *H04N 2005/4425* (2013.01)

(58) Field of Classification Search
USPC ....... 348/565, 564, 563, 553, 569, 580, 581, 348/585, 588, 598, 684, 731, 734; 345/660, 345/667, 173; 725/110, 111; 715/717, 205
See application file for complete search history.

(56) References Cited

U.S. PATENT DOCUMENTS

| 5,901,366 A | * | 5/1999 | Nakano | ................ H04B 1/3833 348/565 |
| 6,075,575 A | * | 6/2000 | Schein | ............... H04N 5/44543 345/684 |

(Continued)

FOREIGN PATENT DOCUMENTS

| CN | 101355688 A | 1/2009 |
| CN | 102186038 A | 9/2011 |

(Continued)

OTHER PUBLICATIONS

European Search Report dated Jun. 19, 2015 of European patent Application No. 13807868.8.

*Primary Examiner* — Paulos M Natnael
*Assistant Examiner* — Mustafizur Rahman
(74) *Attorney, Agent, or Firm* — Plumsea Law Group, LLC

(57) ABSTRACT

A method for implementing split-screen viewing of television, a set-top box and a television system are provided, wherein the method includes: a set-top box receiving a play control signal sent by a remote control terminal, generating a split-screen control signal according to the play control signal, and sending the split-screen control signal to a television terminal; the television terminal implementing split-screen playing of two or more than two programs according to the split-screen control signal. The abovementioned technical scheme can solve the problem in the prior art that, the television terminal can play a single program at a time, resulting in a poor user experience.

13 Claims, 4 Drawing Sheets

(51) Int. Cl.
  *H04N 21/431* (2011.01)
  *H04N 5/44* (2011.01)
  *H04N 21/422* (2011.01)

(56) References Cited

U.S. PATENT DOCUMENTS

| | | | |
|---|---|---|---|
| 6,590,618 B1 | 7/2003 | Park et al. | |
| 7,119,849 B2 * | 10/2006 | Yui | G06F 3/14 345/660 |
| 7,821,577 B2 * | 10/2010 | Hong | H04N 5/44591 348/564 |
| 8,150,387 B2 | 4/2012 | Klein et al. | |
| 8,584,174 B1 * | 11/2013 | Fyock | H04N 21/4316 725/10 |
| 2002/0069411 A1 * | 6/2002 | Rainville | H04N 5/44504 725/37 |
| 2003/0005439 A1 * | 1/2003 | Rovira | H04N 7/163 725/37 |
| 2003/0227570 A1 * | 12/2003 | Kim | H04N 5/45 348/564 |
| 2004/0196405 A1 * | 10/2004 | Spinelli | H04N 5/45 348/565 |
| 2007/0229706 A1 | 10/2007 | Watanabe et al. | |
| 2007/0236611 A1 * | 10/2007 | Lin | H04N 5/44543 348/731 |
| 2007/0287498 A1 * | 12/2007 | Wang | G06Q 10/087 455/556.1 |
| 2008/0117339 A1 * | 5/2008 | Kirsche | H04N 5/4403 348/734 |
| 2008/0235586 A1 * | 9/2008 | Chou | H04N 5/44591 715/717 |
| 2009/0021474 A1 * | 1/2009 | Bentley | H04N 7/17318 345/156 |
| 2010/0042911 A1 * | 2/2010 | Wormald | G06Q 30/02 715/205 |
| 2010/0079670 A1 * | 4/2010 | Frazier | H04N 5/44591 348/564 |
| 2010/0188579 A1 * | 7/2010 | Friedman | H04N 5/45 348/565 |
| 2011/0302619 A1 * | 12/2011 | Hale | G08C 17/00 725/110 |
| 2012/0079547 A1 * | 3/2012 | Kim | H04N 21/43615 725/111 |
| 2012/0139847 A1 | 6/2012 | Hunt | |

FOREIGN PATENT DOCUMENTS

| | | |
|---|---|---|
| CN | 102905183 A | 1/2013 |
| WO | 2009/122372 A2 | 10/2009 |

\* cited by examiner

METHOD FOR IMPLEMENTING SPLIT-SCREEN VIEWING OF TELEVISION PROGRAMS, SET-TOP BOX, AND TELEVISION SYSTEM

CROSS-REFERENCE TO RELATED APPLICATION(S)

This application is the U.S. National Phase application of PCT application number PCT/CN2013/081723 having a PCT filing date of Aug. 19, 2013, which claims priority of Chinese parent application 201210384227.1 filed on Oct. 11, 2012, the disclosures of which are hereby incorporated by reference.

TECHNICAL FIELD

The present document relates to the field of electronics, and more particularly, to a method for implementing split-screen viewing of television, a set-top box and a television system.

BACKGROUND OF THE RELATED ART

With the development of wireless network technology and intelligent terminal technology, the most common remote control terminals at home are more intelligent, and a user can remotely control a television system through a portable mobile terminal, however, currently most of the television terminals can only play a single program at a time, and the viewing experience of a television system equipped with a remote control terminal needs to be upgraded.

SUMMARY OF THE INVENTION

The embodiment of the present invention provides a method for implementing split-screen viewing of television, a set-top box and a television system, to solve the problem in the prior art that a television terminal can only play a single program at a time, resulting in a poor user experience.

To solve the abovementioned technical problem, the embodiment of the present invention adopts the following technical scheme.

A method for implementing split-screen viewing of television comprises: a set-top box receiving a play control signal sent by a remote control terminal, generating a split-screen control signal according to the play control signal, sending the split-screen control signal to a television terminal, wherein the split-screen control signal is used for controlling the television terminal to implement split-screen playing of two or more than two programs.

Preferably, the play control signal is an indication signal of adding broadcast programs, an indication signal of reducing broadcast programs, and/or a split-screen mode selection signal.

Preferably, the set-top box generating a split-screen control signal according to the play control signal comprises:

the set-top box calculating the total number of programs which currently need to be played at the same time according to the indication signal of adding broadcast programs or the indication signal of reducing broadcast programs, matching a corresponding split-screen mode according to the total number of programs and a pre-established mapping relationship between a total number of programs played at the same time and a split-screen mode; and/or, the set-top box matching a corresponding split-screen mode according to the split-screen mode selection signal and a pre-established mapping relationship between a split-screen mode selection signal and the split-screen mode;

the set-top box generating a corresponding split-screen control signal according to the matched split-screen mode.

Preferably, the split-screen mode comprises a longitudinal split-screen mode, a horizontal split-screen mode and/or a picture-in-picture (PiP) spat-screen mode.

Preferably, the method for implementing split-screen viewing of television further comprises: the set-top box receiving a spat-screen mode operation signal sent by the remote control terminal, and performing corresponding operations according to the split-screen mode operation signal, wherein the operations comprise one or more of creating, adding, deleting and updating a split-screen mode.

Preferably, the set-top box receiving the play control signal sent by the remote control terminal comprises: the set-top box receiving a play control signal in a WIFI data format sent by the remote control terminal via a WIFI communication way, and converting the received play control signal in the WIFI data format into a standard data format supported by the television system.

A set-top box comprises a signal receiving module, a signal processing module and a signal sending module, wherein the signal receiving module is used for receiving a play control signal sent by the remote control terminal; the signal processing module is used for generating a split-screen control signal according to the play control signal; the signal sending module is used for sending the split-screen control signal to the television terminal, wherein the split-screen control signal is used for controlling the television terminal to implement split-screen playing of two or more than two programs.

Preferably, the signal processing module comprises a split-screen mode matching module, a storage module, and a split-screen control signal generating module, wherein:

the storage module is used for pre-storing at least one split-screen mode, a mapping relationship between a total number of programs played at the same time and the split-screen mode and/or a mapping relationship between a spot-screen mode selection signal and the split-screen mode;

the split-screen mode matching module is used to calculate a total number of programs which currently need to be played at the same time according to the indication signal of adding broadcast programs or the indication signal of reducing broadcast programs, and match a corresponding spot-screen mode according to the total number of programs and the mapping relationship in the storage module; and/or, match the corresponding split-screen mode according to the split-screen mode selection signal and the mapping relationship in the storage module;

the split-screen control signal generating module is used to generate a split-screen control signal corresponding to the matched split-screen mode.

Preferably, the set-top box further comprises a split-screen mode setting module which is used to perform corresponding operations according to a split-screen mode operation signal, which is sent by the remote control terminal, received by the signal receiving module, wherein the operations comprise one or more of creating, adding, deleting and updating a split-screen mode.

Preferably, the signal receiving module comprises a WIFI communicating module and a data format processing module; wherein the WIFI communicating module is used to receive a signal in the WIFI data format sent by the remote control terminal; the data format processing module is used to convert the received signal in the WIFI data format into a standard data format supported by the television system.

A television system comprises any one of the abovementioned set-top box, and further comprises a television terminal; the television terminal is used to implement split-screen playing of two or more than two programs according to a split-screen control signal sent by the set-top box.

Preferably, the television system further comprises a remote control terminal, and the remote control terminal is used to send a play control signal and/or a split-screen mode operation signal to the set-top box, wherein the split-screen mode operation signal comprises one or more of signals of creating, adding, deleting and updating a split-screen mode.

Preferably, the remote control terminal obtains a remote control application program for operating the set-top box through a network-downloading way.

Preferably, the remote control terminal is a mobile terminal.

The beneficial effects of the abovementioned scheme are: a set-top box generating a split-screen control signal according to a play control signal sent by a remote control terminal, and sending the split-screen control signal to a television terminal, so that the television terminal implements split-screen playing of two or more than two programs. The television terminal can play two or more than two programs at the same time, which enhances the user experience.

Furthermore, the remote control terminal is a mobile terminal, which implements the remote control of the intelligence of a television terminal based on the convenience and intelligence of the mobile terminal.

PREFERRED EMBODIMENTS OF THE INVENTION

To make purposes, technical schemes and advantages of the patent document more apparent, hereinafter in conjunction with the accompanying drawings, the embodiments of the present invention will be described in detail. It should be noted that in the case of no conflict, embodiments of the present application and features in the embodiments may be arbitrarily combined with each other.

Figure 1:
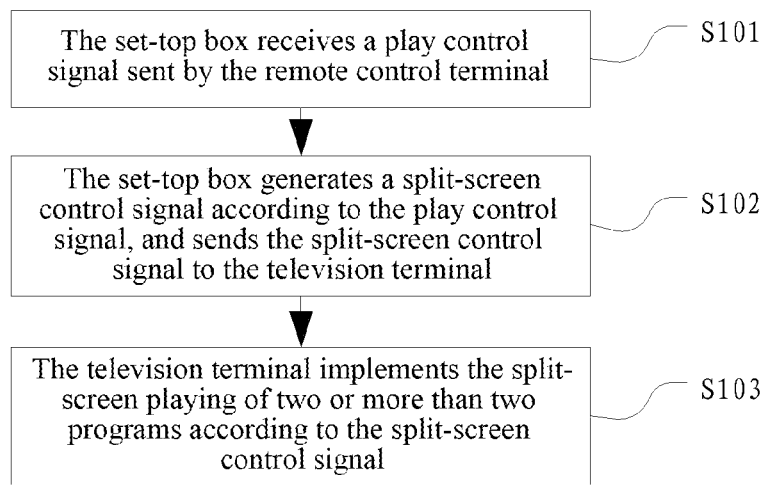
FIG. 1 is a flow chart of a method for implementing split-screen viewing of television in accordance with an embodiment of the present invention.

FIG. 1 is a flow chart of a method for implementing split-screen viewing of television provided in an embodiment of the present invention, and as shown in FIG. 1, it comprises the following steps:

in S101, the set-top box receives a play control signal sent by the remote control terminal.

The remote control terminal may be an ordinary television remote controller, or a mobile terminal (such as a mobile phone, an IPAD, etc.), and for the mobile terminal, a remote control application program can be downloaded through the network, and the remote control application program supports various operations on the set-top box.

Preferably, the set-top box receives a play control signal in the WIFI data format sent by the remote control terminal through a WIFI communication way, and converts the received play control signal into a standard data format supported by the television system.

Preferably, the play control signal may be an indication signal of adding broadcast programs, an indication signal of reducing broadcast programs and/or a split-screen mode selection signal; wherein:

the indication signal of adding broadcast programs refers to: the user adding one new program which needs to be played at the same time through a human-machine interface (HMI) unit in the remote control terminal; after receiving the indication signal of adding broadcast programs, the set-top box sending the data stream of the newly added program to the television terminal, or integrating the data stream of the programs which need to be played at the same time and sends it to the television terminal, calculating the total number of programs which currently need to be played at the same time, matching a corresponding split-screen mode according to the calculated total number of programs and the pre-established mapping relationship between the total number of programs played at the same time and the split-screen mode, generating a split-screen control signal according to the matched split-screen mode, and sending the split-screen control signal to the television terminal.

The indication signal of reducing broadcast programs refers to: the user stopping playing a program at the same time through the human-machine interface unit in a remote control terminal; after receiving the indication signal of reducing broadcast programs, the set-top box stopping sending data stream of the stopped broadcast program to the television terminal, and calculating the total number of programs which currently need to be played at the same time, matching a corresponding split-screen mode according to the calculated total number of programs and the pre-established mapping relationship between the total number of programs played at the same time and the split-screen mode, generating a split-screen control signal according to the matched split-screen mode and sending the split-screen control signal to the television terminal.

The split-screen mode selection signal refers to: the remote control terminal pre-storing a plurality of split-screen modes, and the remote control terminal providing the user with at least one split-screen mode option through the human-machine interface unit, the user selecting one split-screen mode thereof through the human-machine interface unit in the remote control terminal, and the remote control terminal sending the selection signal to the set-top box; after receiving the split-screen mode selection signal, the set-top box matching the corresponding split-screen mode according to the split-screen mode selection signal and the pre-established mapping relationship between the split-screen mode selection signal and the split-screen mode, generating a split-screen control signal according to the matched split-screen mode, and also sending the split-screen control signal to the television terminal.

If the play control signal sent by the remote control terminal comprises both the split-screen mode selection signal and the indication signal of adding broadcast programs; or both the split-screen mode selection signal and the indication signal of reducing broadcast programs, then the set-top box matches the corresponding split-screen mode according to the split-screen mode selection signal and the pre-established mapping relationship between the split-screen mode selection signal and the split-screen mode, and also combining with the total number of programs which currently need to be played at the same time, the corresponding split-screen mode is matched according to the number of programs and the pre-established mapping relationship between the total number of programs played at the same time and the split-screen mode.

In S102, the set-top box generates a split-screen control signal according to the play control signal, and sends the split-screen control signal to the television terminal, and the split-screen control signal is used to control the television terminal to achieve the split-screen playing of two or more than two programs.

In S103, the television terminal implements the split-screen playing of two or more than two programs according to the split-screen control signal.

Figure 2A:
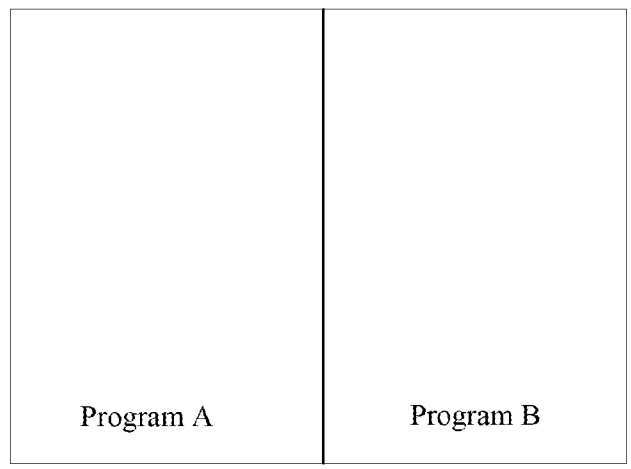
FIG. 2a is a schematic diagram of a longitudinal split-screen mode provided in an embodiment of the present invention.
Figure 2B:
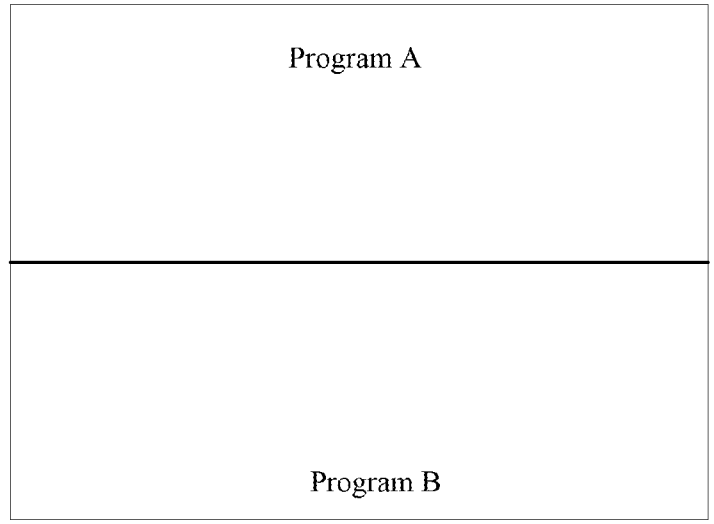
FIG. 2b is a schematic diagram of a horizontal split-screen mode provided in an embodiment of the present invention.
Figure 2C:
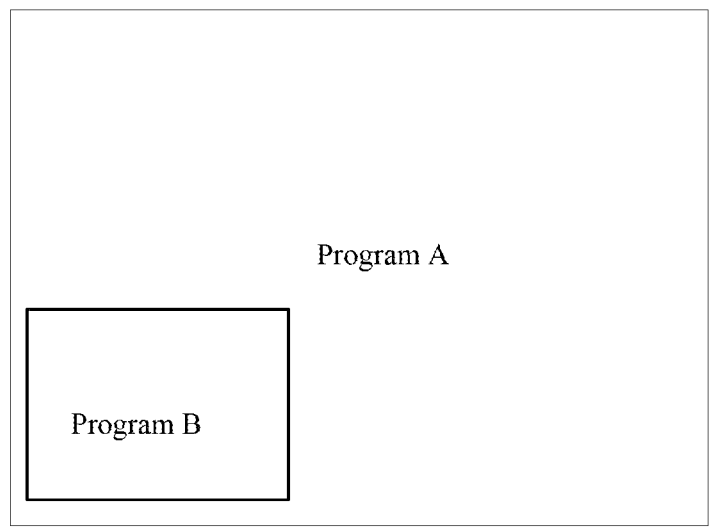
FIG. 2c is a schematic diagram of a PiP split-screen mode provided in an embodiment of the present invention.

Preferably, the split-screen mode comprises a longitudinal split-screen mode, a horizontal split-screen mode and/or a PiP split-screen mode, that is, it may be the longitudinal split-screen mode, the horizontal split-screen mode or the PiP split-screen mode, or a combination of these modes. Taking that two programs (program A and program B) currently need to be played at the same time for example, the longitudinal split-screen mode is shown in FIG. 2a, the horizontal split-screen mode is shown in FIG. 2b, and the PiP split-screen mode is shown in FIG. 2c.

Figure 3:
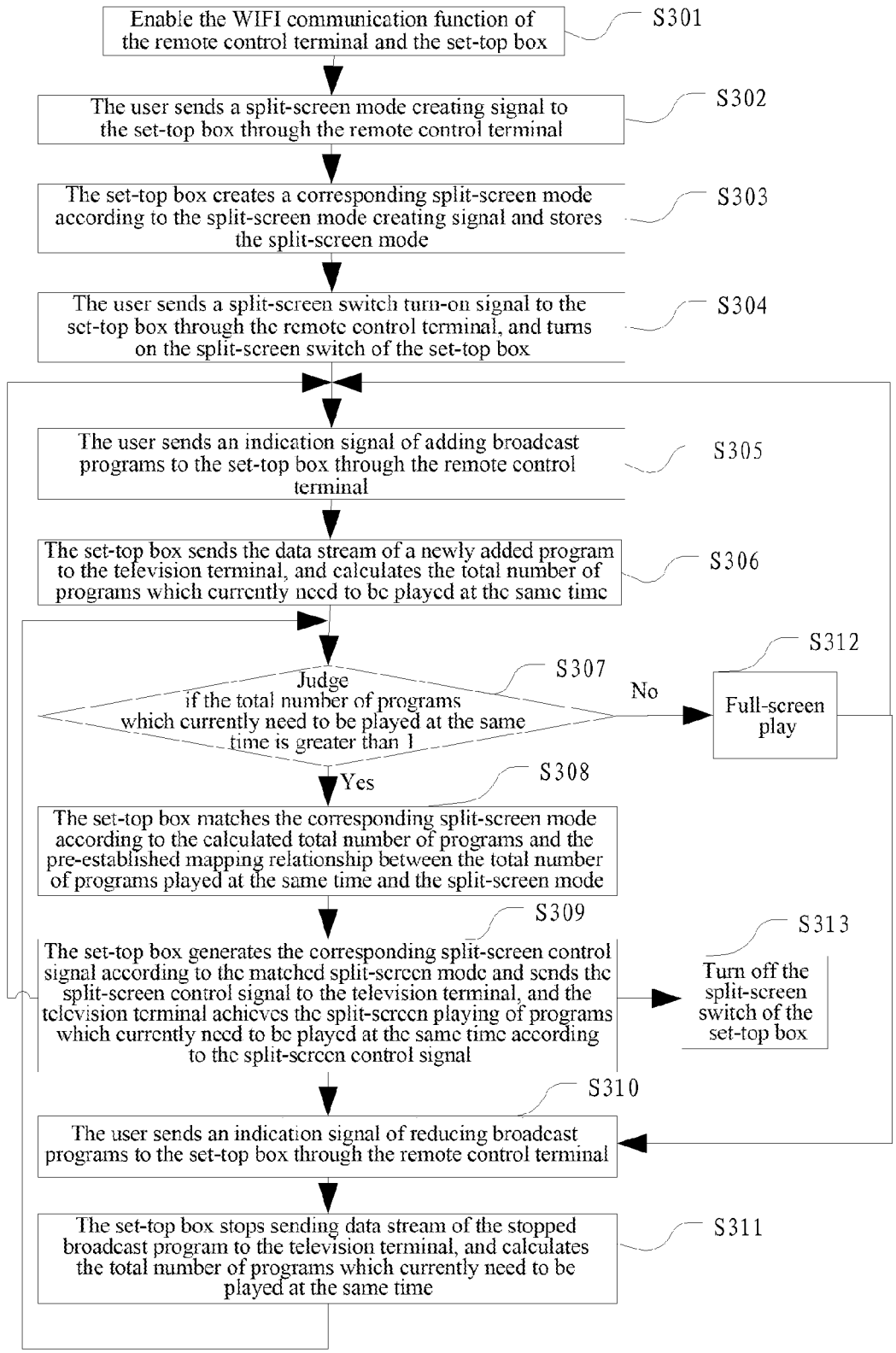
FIG. 3 is a flow chart of a method for implementing split-screen viewing of television provided in another embodiment of the present invention.

FIG. 3 is a flow chart of the method for implementing spot-screen viewing of television provided in another embodiment of the present invention, and as shown in FIG. 3, it comprises the following steps:

in S301, it is to enable the WIFI communication function of the remote control terminal and the set-top box, proceeding to step S302.

In S302, the user triggers a split-screen mode creating item in the HMI unit in the remote control terminal, and sends a split-screen mode creating signal to the set-top box through a WIFI communication way, proceeding to step S303.

Preferably, the HMI unit in the remote control terminal is equipped with a human-machine operation window, and the human-machine operation window is equipped with the following control items: the split-screen creating, split-screen adding, split-screen deleting and split-screen updating, adding broadcast program, reducing broadcast program, spat-screen mode selection, split-screen switch and so on.

In S303, the set-top box receives the split-screen mode creating signal sent by the remote control terminal through a WIFI communication way, and creates the corresponding split-screen mode according to the spot-screen mode creating signal and stores the split-screen mode, proceeding to step S304.

In S304, the user triggers a split-screen switch item in the HMI unit in the remote control terminal, and sends a split-screen switch turn-on signal to the set-top box via a WIFI communication way, turning on the split-screen switch of the set-top box, proceeding to step S305.

In S305, the user triggers the adding broadcast program item in the HMI unit in the remote control terminal, and sends an indication signal of adding broadcast programs to the set-top box through the WIFI communication way, proceeding to step S306.

In S306, the set-top box receives the indication signal of adding broadcast programs through the WIFI communication way, sends the data stream of the newly added program to the television terminal, and calculates the total number of programs which currently need to be played at the same proceeding to step S307.

In S307, the set-top box judges whether the total number of programs which currently need to be played at the same time is greater than 1 or not, if yes, proceeding to step S308, otherwise proceeding to step S312.

In S308, the set-top box matches the corresponding split-screen mode according to the calculated total number of programs, and the pre-established mapping relationship between the total number of programs played at the same time and the split-screen mode, proceeding to step S309.

In S309, the set-top box generates the corresponding split-screen control signal according to the matched split-screen mode and sends the split-screen control signal to the television terminal, and the television terminal achieves the split-screen playing of programs which currently need to be played at the same time according to the split-screen control signal, proceeding to step S305 or S310 or S313.

In S310, during the play, the user triggers the reducing broadcast program item in the HMI unit in the remote control terminal, sends an indication signal of reducing broadcast programs to the set-top box through the WIFI communication way, proceeding to step S311.

In S311, the set-top box receives the indication signal of reducing broadcast programs through the WIFI communication way, stops sending data stream of the stopped broadcast program to the television terminal, and calculates the total number of programs which currently need to be played at the same time, proceeding to the step S307.

In S312, the set-top box sends a full-screen control signal to the television terminal, and the television terminal performs full-screen playing on a single program which currently needs to be played at the same time according to the full-screen control signal, proceeding to step S305 or S310.

In S313, the user triggers the split-screen switch item in the HMI unit in the remote control terminal, sends a split-screen switch turn-off signal to the set-top box through the WIFI communication way, and turns off the split-screen switch of the set-top box.

The present embodiment may further comprise: the user triggering the split-screen mode adding item, split-screen mode deleting item or spat-screen mode updating item in the HMI unit in the remote control terminal, and correspondingly sending a split-screen mode adding signal, a split-screen mode deleting signal, or a split-screen mode updating signal to the set-top box through the WIFI communication way, and the set-top box receiving the signal sent by the remote control terminal through the WIFI communication way, and correspondingly adding, deleting, or updating the split-screen mode.

This embodiment provides a way in which the set-top box matches the spat-screen mode according to the total number of programs which currently need to be played at the same time, and in an actual application, at the same time of the user triggering the adding broadcast program item and the reducing broadcast program item in the HMI unit in the remote control terminal, or in the split-screen playing process, the split-screen mode selection item may also be triggered in the human-machine interface unit in the remote control terminal to let the user actively select the split-screen mode, or a combination thereof.

Figure 4:
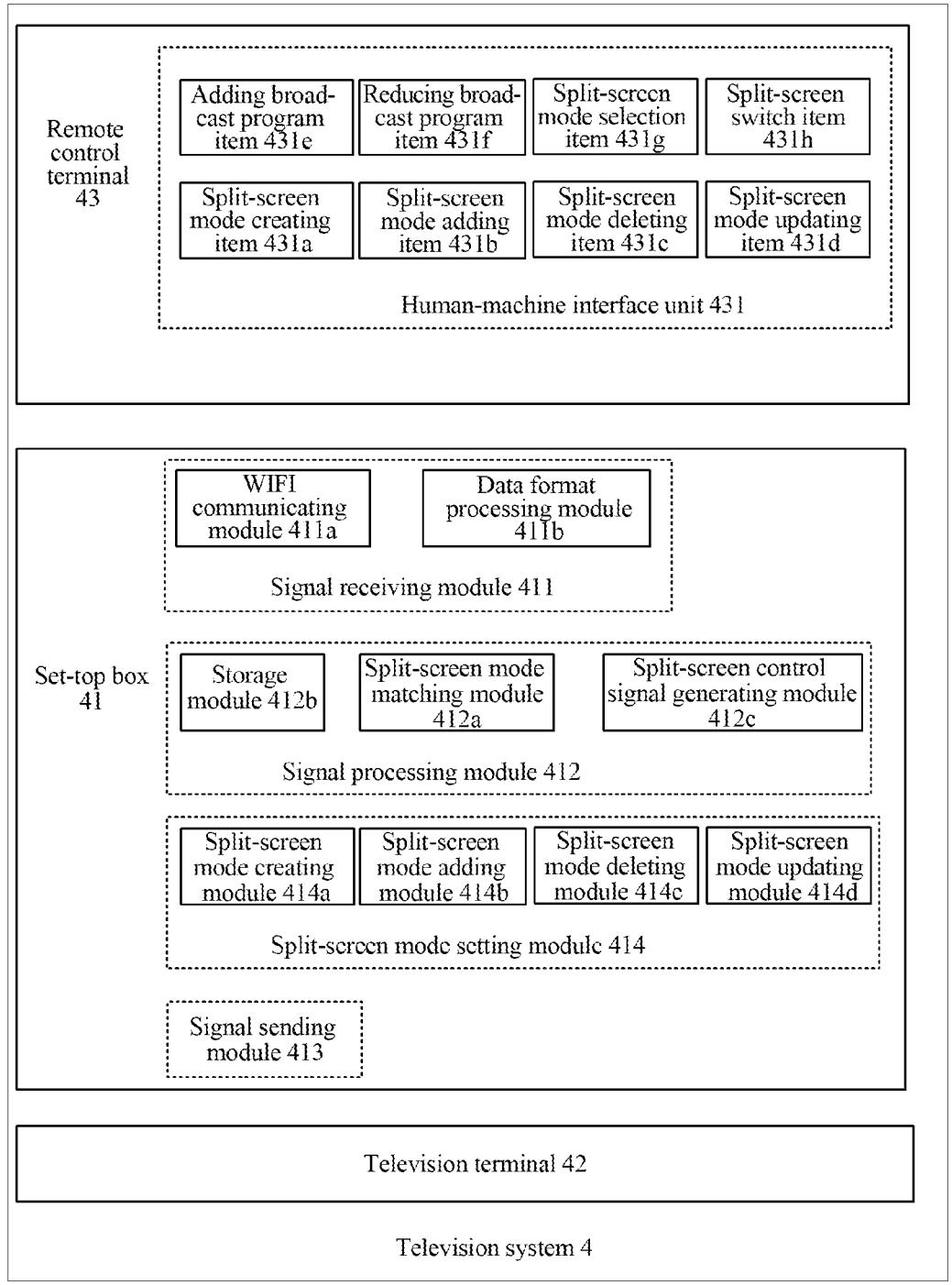
FIG. 4 is a schematic diagram of a television system provided in an embodiment of the present invention.

FIG. 4 shows a schematic diagram of a television system provided in an embodiment of the present invention, and the television system 4 comprises a set-top box 41 and a television terminal 42; the set-top box 41 comprises a signal receiving module 411, a signal processing module 412 and a signal sending module 413; the television terminal 42 is used to implement the split-screen playing of two or more than two programs according to the split-screen control signal sent by the signal sending module 413.

The signal receiving module 411 is used to receive a play control signal sent by the remote control terminal;

Preferably, the play control signal may be an indication signal of adding broadcast programs, an indication signal of reducing broadcast programs, and/or a split-screen mode selection signal.

Preferably, the signal receiving module 411 may further comprise a WIFI communicating module 411a and a data format processing module 411b; wherein the WIFI communicating module 411a is used to perform a WIFI communication with the remote control terminal, and receive a signal in the WIFI data format sent by the remote control terminal, such as the split-screen mode creating signal, the split-screen mode adding signal, the split-screen mode deleting signal, the split-screen mode updating signal, the indication signal of adding broadcast programs, the indication signal of reducing broadcast programs, the split-screen mode selection signal, the spat-screen switch turn-on signal, the split-screen switch turn-off signal and so on; the data format processing module 411b is used to convert the signal in the WIFI data format received by the WIFI communicating modules 411a into a standard data format supported by the television system.

The signal processing module 412 is used to generate a split-screen control signal according to the play control signal received by the signal receiving module 411. The split-screen control signal is used to control the television terminal to achieve the split-screen playing of two or more than two programs.

Preferably, the signal processing module 412 may further comprise a split-screen mode matching module 412a, a storage module 412b and a split-screen control signal generating module 412c, wherein the storage module 412b is used to pre-store at least one split-screen mode, as well as the total number of programs played at the same time and/or the mapping relationship between the split-screen mode selection signal and the split-screen mode; preferably, the split-screen mode comprises a longitudinal split-screen mode, a horizontal split-screen mode and/or a PiP split-screen mode, that is, it may be the longitudinal split-screen mode, the horizontal split-screen mode or the PiP split-screen mode, or a combination of these modes. Taking that two programs (program A and program B) currently need to be played at the same time for example, the longitudinal split-screen mode is shown in FIG. 2a, the horizontal split-screen mode is shown in FIG. 2b, and the PiP spat-screen mode is shown in FIG. 2c.

The split-screen mode matching module 412a is used to match the corresponding split-screen mode according to the play control signal, specifically: calculate the total number of the programs which currently need to be played at the same time according to the indication signal of adding broadcast programs or the indication signal of reducing broadcast programs, match the corresponding split-screen mode according to the total number of programs and the mapping relationship in the storage module; and/or match the corresponding split-screen mode according to the split-screen mode selection signal and the mapping relationship in the storage module;

the split-screen control signal generating module 412c is used to generate a split-screen control signal corresponding to the matched split-screen mode.

The signal sending module 413 is used to send the split-screen control signal generated by the signal processing module 412 to the television terminal, and after the television terminal receives the signal, it can implement split-screen playing of two or more than two programs according to the split-screen control signal.

The set-top box 41 may further comprise a split-screen mode setting module 414, which is used to correspondingly create, add, delete and/or update a split-screen mode according to the split-screen mode operation signal, which is sent by the remote control terminal and received by the signal receiving module 411, such as the split-screen mode creating signal, the split-screen mode adding signal, the split-screen mode deleting signal and/or the split-screen mode updating signal sent by the remote control terminal. Furthermore, the split-screen mode setting module 414 may be divided into a split-screen mode creating module 414a, a split-screen mode adding module 414b, a split-screen mode deleting module 414c and a split-screen mode updating module 414d, respectively used for correspondingly creating, adding, deleting and updating a split-screen mode according to the split-screen mode creating signal, split-screen mode adding signal, split-screen mode deleting signal and split-screen mode updating signal sent by the remote control terminal and received by the signal receiving module 411.

The television system 4 may further comprise a remote control terminal 43, and the remote control terminal 43 may be an ordinary television remote controller, or a mobile terminal (such as a mobile phone, an IPAD, etc.), and for the mobile terminal, a remote control application program can be downloaded through the network, and the remote control application program supports various operations on the set-top box 41. The remote control terminal 43 is used for sending a remote control signal to the set-top box 41, such as the play control signal, the split-screen mode creating signal, the split-screen mode adding signal, the split-screen mode deleting signal or the split-screen mode updating signal and so on.

Preferably, the remote control terminal 43 comprises a human-machine interface unit 431, and the human-machine interface unit 431 is provided with a human-machine operation window, and the human-machine operation window is provided with the following control items: split-screen mode creating item 431a, split-screen mode adding item 431b, split-screen mode deleting item 431c, split-screen mode updating item 431d, adding broadcast program item 431e, reducing broadcast program item 431f, split-screen mode selection item 431g, split-screen switch item 431h and so on.

After the user triggers the split-screen mode creating item 431a, the remote control terminal 43 generates and sends a split-screen mode creating signal to the set-top box 41, and the set-top box 41 creates the corresponding split-screen mode according to the split-screen mode creating signal;

after the user triggers the split-screen mode adding item 431b, the remote control terminal 43 generates and sends the split-screen mode adding signal to the set-top box 41, and the set-top box 41 adds the corresponding split-screen mode according to the split-screen mode adding signal:

after the user triggers the split-screen mode deleting item 431c, the remote control terminal 43 generates and sends the split-screen mode deleting signal to the set-top box 41, and the set-top box 41 deletes the corresponding split-screen mode according to the split-screen mode deleting signal;

after the user triggers the split-screen mode updating item 431d, the remote control terminal 43 generates and sends the split-screen mode updating signal to the set-top box 41, and the set-top box 41 updates the corresponding split-screen mode according to the split-screen mode updating signal;

after the user triggers the adding broadcast program item 431e, the remote control terminal 43 generates and sends an indication signal of adding broadcast programs to the set-top box 41, and the set-top box 41 sends the data stream of the newly added program to the television terminal and calculates the total number of programs which currently need to be played at the same time, and matches the corresponding split-screen mode according to the calculated total number of programs and the pre-established mapping relationship between the total number of programs played at the same time and the screen-split mode.

After the user triggers the reducing broadcast program item 431*f*, the remote control terminal 43 generates and sends an indication signal of reducing broadcast programs to the set-top box 41, and the set-top box 41 stops sending the data stream of the stopped broadcast program to the television terminal, and calculates the total number of programs which currently need to be played at the same time, and matches the corresponding split-screen mode according to the calculated total number of programs and the pre-established mapping relationship between the total number of programs played at the same time and the screen-split mode.

The remote control terminal provides the user with at least one spat-screen mode option, and after the user triggers the split-screen mode selection item 431*g*, the remote control terminal 43 generates and sends a split-screen mode selection signal to the set-top box 41, and the set-top box 41 matches the corresponding split-screen mode according to the split-screen mode selection signal and the pre-established mapping relationship between the split-screen mode selection signal and the split-screen mode.

After the user triggers the split-screen switch item 431*h*, the remote control terminal 43 generates and sends a split-screen switch turn-on signal or split-screen switch turn-off signal to the set-top box 41, and the set-top box 41 correspondingly turns on or off the spat-screen switch of the set-top box;

In the abovementioned scheme, the set-top box receives a play control signal sent by a remote control terminal, generates a split-screen control signal according to the play control signal and sends the split-screen control signal to the television terminal; the television terminal achieves split-screen playing of two or more than two programs according to the split-screen control signal. It comprises a way of the set-top box matching the split-screen mode according to the total number of programs which currently need to be played at the same time, further comprising a way of the user actively selecting the split-screen mode via a remote control terminal, as well as a combination of both. The abovementioned scheme can make the television terminal implement the split-screen playing of two or more than two programs. The television terminal can play two or more than two programs at the same time, thereby enhancing the user experience.

Those ordinarily skilled in the art can understand that all or some of steps of the abovementioned method may be completed by the programs instructing the relevant hardware, and the programs may be stored in a computer-readable storage medium, such as a read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The patent document is not limited to any specific form of hardware and software combinations.

It should be noted that, the patent document may have a variety of other embodiments, and without departing from the spirit and essence of the patent document, a person skilled in the art can make various changes and modifications according to the patent document, and these corresponding changes and modifications should belong to the protection scope of the appended claims of the present document.

INDUSTRIAL APPLICABILITY

Compared with the related art, the method for implementing split-screen viewing of television, the set-top box and the method for implementing the desktop of the terminal device in the television system, the system and the terminal device provided in the embodiments of the present invention can make the television terminal to achieve split-screen playing of two or more than two programs. The television terminal is enabled to play two or more than two programs at the same time, thereby enhancing the user experience.

What is claimed is:

1. A method for implementing split-screen viewing of television, comprising:
   a set-top box receiving a play control signal sent by a remote control terminal;
   the set-top box generating a split-screen control signal according to the play control signal;
   the set-top box sending the split-screen control signal to a television terminal, wherein the split-screen control signal is used for controlling the television terminal to implement split-screen playing of two or more than two programs;
   wherein, the play control signal is an indication signal of adding broadcast programs, an indication signal of reducing broadcast programs, and/or a split-screen mode selection signal; and
   the set-top box generating a split-screen control signal according to the play control signal comprises:
   the set-top box calculating a total number of programs which currently need to be played at the same time according to the indication signal of adding broadcast programs or the indication signal of reducing broadcast programs, matching a corresponding split-screen mode according to the total number of programs and a pre-established mapping relationship between the total number of programs played at the same time and a split-screen mode comprising a longitudinal split-screen mode, a horizontal split-screen mode and/or a picture-in-picture (PiP) split-screen mode; and/or, the set-top box matching a corresponding split-screen mode according to the split-screen mode selection signal and a pre-established mapping relationship between the split-screen mode selection signal and the split-screen mode comprising a longitudinal split-screen mode, a horizontal split-screen mode and/or a picture-in-picture (PiP) split-screen mode;
   the set-top box generating a corresponding split-screen control signal according to the matched split-screen mode.

2. The method for implementing split-screen viewing of television of claim 1, further comprising: the set-top box receiving a split-screen mode operation signal sent by the remote control terminal, and performing corresponding operations according to the split-screen mode operation signal, wherein the operations comprise one or more of creating, adding, deleting and updating a split-screen mode.

3. The method for implementing split-screen viewing of television of claim 1, wherein the set-top box receiving the play control signal sent by the remote control terminal comprises:
the set-top box receiving a play control signal in a WIFI data format sent by the remote control terminal via a WIFI communication way, and converting the received play control signal in the WIFI data format into a standard data format supported by a television system.

4. A set-top box, comprising a signal receiving module, a signal processing module and a signal sending module, wherein
the signal receiving module is used to receive a play control signal sent by a remote control terminal;
the signal processing module is used to generate a split-screen control signal according to the play control signal;
the signal sending module is used to send the split-screen control signal to a television terminal, wherein the split-screen control signal is used for controlling the television terminal to implement split-screen playing of two or more than two programs;
wherein the signal processing module comprises a split-screen mode matching module, a storage module and a split-screen control signal generating module, wherein:
the storage module is used to pre-store at least one split-screen mode, a mapping relationship between a total number of programs played at the same time and the split-screen mode comprising a longitudinal split-screen mode, a horizontal split-screen mode and/or a picture-in-picture (PiP) split-screen mode, and/or a mapping relationship between a split-screen mode selection signal and the split-screen mode comprising a longitudinal split-screen mode, a horizontal split-screen mode and/or a picture-in-picture (PiP) split-screen mode;
the split-screen mode matching module is used to calculate a total number of programs which currently need to be played at the same time according to an indication signal of adding broadcast programs or an indication signal of reducing broadcast programs, and match a corresponding split-screen mode according to the total number of programs and the mapping relationship in the storage module; and/or, match a corresponding split-screen mode according to the split-screen mode selection signal and the mapping relationship in the storage module;
the split-screen control signal generating module is used to generate a split-screen control signal corresponding to the matched split-screen mode.

5. The set-top box of claim 4, wherein the set-top box further comprises a split-screen mode setting module which is used to perform corresponding operations according to a split-screen mode operation signal, which is sent by the remote control terminal, received by the signal receiving module, wherein the operations comprise one or more of creating, adding, deleting and updating a split-screen mode.

6. The set-top box of claim 4, wherein the signal receiving module comprises a WIFI communicating module and a data format processing module; wherein
the WIFI communicating module is used to receive a signal in a WIFI data format sent by the remote control terminal;
the data format processing module is used to convert the received signal in the WIFI data format into a standard data format supported by a television system.

7. A television system, comprising:
a television terminal; and
a set-top box, comprising a signal receiving module, a signal processing module and a signal sending module, wherein
the signal receiving module is used to receive a play control signal sent by a remote control terminal;
the signal processing module is used to generate a split-screen control signal according to the play control signal;
the signal sending module is used to send the split-screen control signal to the television terminal, wherein the split-screen control signal is used for controlling the television terminal to implement split-screen playing of two or more than two programs;
wherein the signal processing module comprises a split-screen mode matching module, a storage module and a split-screen control signal generating module, wherein:
the storage module is used to pre-store at least one split-screen mode, a mapping relationship between a total number of programs played at the same time and the split-screen mode comprising a longitudinal split-screen mode, a horizontal split-screen mode and/or a picture-in-picture (PiP) split-screen mode, and/or a mapping relationship between a split-screen mode selection signal and the split-screen mode comprising a longitudinal split-screen mode, a horizontal split-screen mode and/or a picture-in-picture (PiP) split-screen mode;
the split-screen mode matching module is used to calculate a total number of programs which currently need to be played at the same time according to an indication signal of adding broadcast programs or an indication signal of reducing broadcast programs, and match a corresponding split-screen mode according to the total number of programs and the mapping relationship in the storage module; and/or, match a corresponding split-screen mode according to the split-screen mode selection signal and the mapping relationship in the storage module;
the split-screen control signal generating module is used to generate a split-screen control signal corresponding to the matched split-screen mode; and
wherein the television terminal is used to implement split-screen playing of two or more than two programs according to a split-screen control signal sent by the set-top box.

8. The television system of claim 7, wherein the television system further comprises a remote control terminal, and the remote control terminal is used to send a play control signal and/or a split-screen mode operation signal to the set-top box, and the split-screen mode operation signal comprises one or more of signals of creating, adding, deleting and updating a split-screen mode.

9. The television system of claim 8, wherein the remote control terminal obtains a remote control application program for operating the set-top box through a network-downloading way.

10. The television system of claim 8, wherein the remote control terminal is a mobile terminal.

11. The method for implementing split-screen viewing of television of claim 1, wherein the set-top box receiving the play control signal sent by the remote control terminal comprises:
the set-top box receiving a play control signal in a WIFI data format sent by the remote control terminal via a WIFI communication way, and converting the received play control signal in the WIFI data format into a standard data format supported by a television system.

12. The method for implementing split-screen viewing of television of claim 2, wherein the set-top box receiving the play control signal sent by the remote control terminal comprises:

the set-top box receiving a play control signal in a WIFI data format sent by the remote control terminal via a WIFI communication way, and converting the received play control signal in the WIFI data format into a standard data format supported by a television system.

13. The set-top box of claim 5, wherein the signal receiving module comprises a WIFI communicating module and a data format processing module; wherein the WIFI communicating module is used to receive a signal in a WIFI data format sent by the remote control terminal;

the data format processing module is used to convert the received signal in the WIFI data format into a standard data format supported by a television system.

* * * * *